United States Patent
Lv (10) Patent No.: US 11,313,475 B2
(45) Date of Patent: Apr. 26, 2022

(54) FLOW CONTROL VALVE (71) Applicant: Zhejiang Sanhua Climate and Applicance Controls Group Co., Ltd., Shaoxing Zhejiang (CN)

(72) Inventor: Ming Lv, Shaoxing Zhejiang (CN)

(73) Assignee: ZHEJIANG SANHUA CLIMATE AND APPLIANCE CONTROLS GROUP CO., LTD., Zhejiang (CN)

( * ) Notice: Subject to any disclaimer, the term of this patent is extended or adjusted under 35 U.S.C. 154(b) by 0 days.

(21) Appl. No.: 17/279,414

(22) PCT Filed: Dec. 24, 2019

(86) PCT No.: PCT/CN2019/127810
§ 371 (c)(1),
(2) Date: Mar. 24, 2021

(87) PCT Pub. No.: WO2020/135396
PCT Pub. Date: Jul. 2, 2020

(65) Prior Publication Data
US 2022/0010882 A1  Jan. 13, 2022

(30) Foreign Application Priority Data
Dec. 28, 2018 (CN) .......................... 201811619295.5

(51) Int. Cl.
*F16K 1/46* (2006.01)
*F16K 1/36* (2006.01)
*F16K 27/02* (2006.01)

(52) U.S. Cl.
CPC ............... *F16K 1/465* (2013.01); *F16K 1/36* (2013.01); *F16K 27/029* (2013.01)

(58) Field of Classification Search
CPC ........... F16K 1/36; F16K 1/465; F16K 27/029
See application file for complete search history.

(56) References Cited

U.S. PATENT DOCUMENTS 2,414,908 A * 1/1947 Smith ................ F16K 1/46
251/333
2,616,653 A * 11/1952 Tarr ................... F16K 1/46
251/333

(Continued)

FOREIGN PATENT DOCUMENTS

| CN | 106641430 A | 5/2017 |
| CN | 207333755 U | 5/2018 |
| CN | 207406780 U | 5/2018 |

OTHER PUBLICATIONS

International Search Report dated Feb. 24, 2020 for PCT application No. PCT/CN2019/127810.

*Primary Examiner* — Eric Keasel
(74) *Attorney, Agent, or Firm* — Ohlandt, Greeley, Ruggiero and Perle, LLP (57) ABSTRACT

A flow control valve, includes a valve body component, a valve seat component and a valve core component, wherein the valve seat component includes a sealing ring, a first annular protruding portion and a second annular protruding portion; the valve core component includes a valve core including a lower section portion; when the valve core abuts against the sealing ring; the first annular protruding portion includes a first inner wall portion; the second annular protruding portion includes a first outer wall portion; and when the valve core abuts against the sealing ring, the minimum inner diameter of the first inner wall portion is $D_1$, the maximum outer diameter of the first outer wall portion is $D_2$, the minimum inner diameter of the lower end portion is $D_3$, and the maximum outer diameter of the lower end portion is $D_4$, then $D_3-D_2<2$ mm, and $D_1-D_4<2$ mm.

20 Claims, 9 Drawing Sheets (56) References Cited

U.S. PATENT DOCUMENTS 3,195,552 A * 7/1965 Rasmussen ............. F16K 49/00
137/315.27
2015/0285400 A1 10/2015 McNeely

* cited by examiner

FLOW CONTROL VALVE

This application is a National Phase entry of PCT Application No. PCT/CN2019/127810, filed on Dec. 24, 2019, which claims the benefit of the priority to Chinese Patent Application No. 201811619295.5, titled "FLOW CONTROL VALVE", filed with the China National Intellectual Property Administration on Dec. 28, 2018, which are incorporated herein by reference in their entireties.

FIELD

The present application relates to the technical field of fluid control, and in particular to a flow control valve.

BACKGROUND

A flow control valve can be used as an important component of a refrigeration system, and the working process of the flow control valve is generally as follows. Under the driving of a driving component, a valve core component moves axially relative to a valve port portion to open or close the flow control valve or adjust the flow of the flow control valve. One of the subjects that those skilled in the art have been paying attention to and continuously improving is the operational reliability of the flow control valve.

SUMMARY

An object of the present application is to provide a flow control valve, in order to improve the operational reliability of the flow control valve.

The flow control valve according to the present application includes a valve body component, a valve seat component and a valve core component. The valve body component is fixedly connected to the valve seat component. The valve core component is arranged in a valve chamber of the flow control valve, and the valve seat component includes a sealed ring, a first annular protrusion and a second annular protrusion. The valve core component includes a valve core, and the valve core includes a lower section portion substantially in a shape of an annular.

In a case that the valve core abuts against the sealed ring, a lower end portion of the lower section portion is located between the first annular protrusion and the second annular protrusion. The first annular protrusion includes a first inner wall portion located at an outer side of the lower end portion and configured to be matched with the lower end portion, and the second annular protrusion includes a first outer wall portion located at an inner side of the lower end portion and configured to be matched with the lower end portion. In the case that the valve core abuts against the sealed ring, a minimum inner diameter of the first inner wall portion is defined as $D_1$, a maximum outer diameter of the first outer wall portion is defined as $D_2$, a minimum inner diameter of the lower end portion is defined as $D_3$, and a maximum outer diameter of the lower end portion is defined as $D_4$, $D_3-D_2<2$ mm, and $D_1-D_4<2$ mm.

According to the flow control valve provided by the present application, the minimum inner diameter of the first inner wall portion is $D_1$, the maximum outer diameter of the first outer wall portion is $D_2$, the minimum inner diameter of the lower end portion is $D_3$, and the maximum outer diameter of the lower end portion is $D_4$, $D_3-D_2<2$ mm, and $D_1-D_4<2$ mm, and then the operational reliability of the flow control valve can be improved.

DETAILED DESCRIPTION OF THE EMBODIMENTS

In order to make those skilled in the art have a better understanding of solutions of the present application, the present application is described in further detail hereinafter, in conjunction with the drawings and embodiments.

It should be noted that, the orientation terms such as upper and lower in the present application are defined in the case that the components are located at the positions shown in the figures of the specification, which are only for clarity and ease of description of the technical solutions. It should be appreciated that, the orientation terms used herein should not limit the protection scope of the present application.

The "axial" in the present application refers to a direction from top to bottom or from bottom to top of a paper surface, which is equivalent to the axial direction of the valve seat component; and the "radial" in the present application refers to a direction perpendicular to the axial direction. "Integral" in the present application refers to be formed by machining from one component, rather than the assembly or fixation of two or more components.

A lower end portion of a lower section portion of a valve mentioned in the present application refers to a portion that can be matched with a first annular protrusion or a second annular protrusion, and has influence on the flow when the flow control valve is in a small opening.

Figure 1:
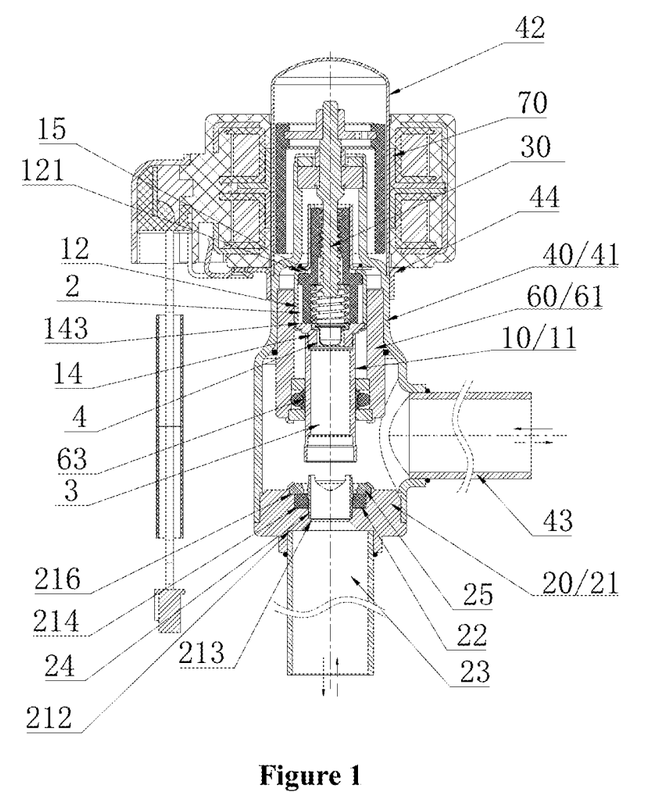
FIG. 1 is a schematic structural view of a first embodiment of a flow control valve according to the present application in a fully open state.
Figure 2:
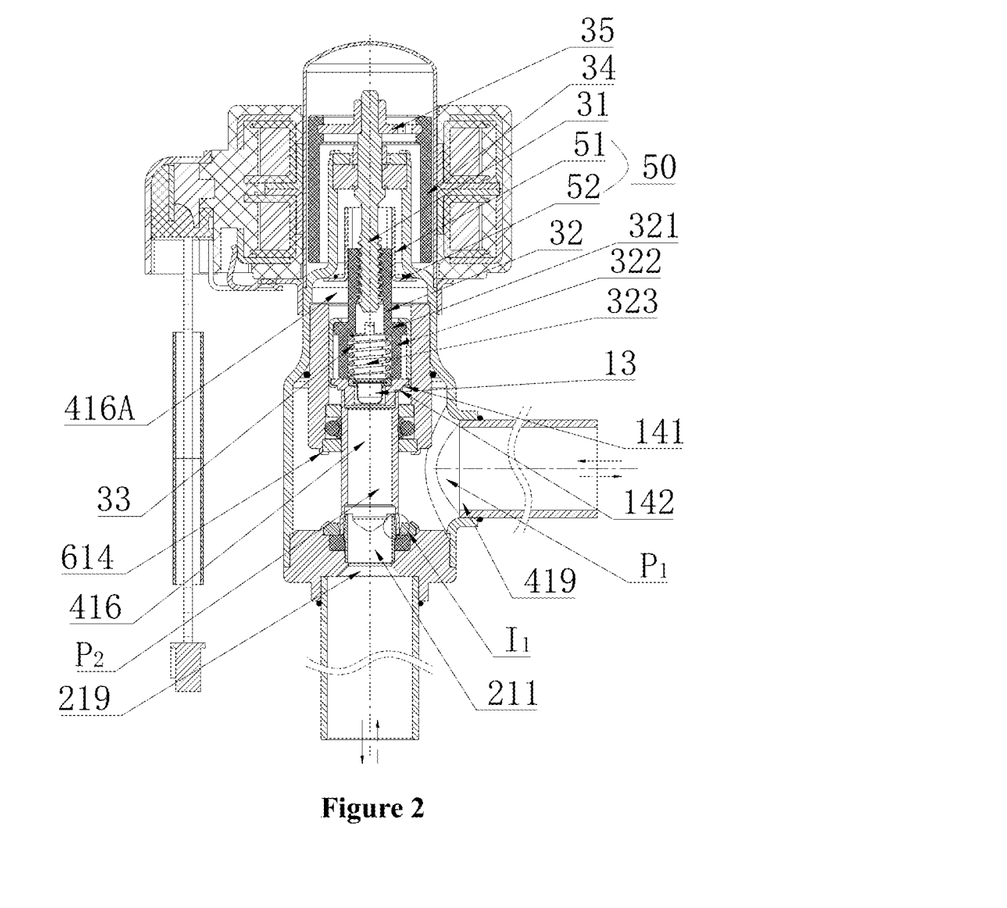
FIG. 2 is a schematic structural view of the flow control valve shown in FIG. 1 when a valve core abuts against a sealed ring.
Figure 3:
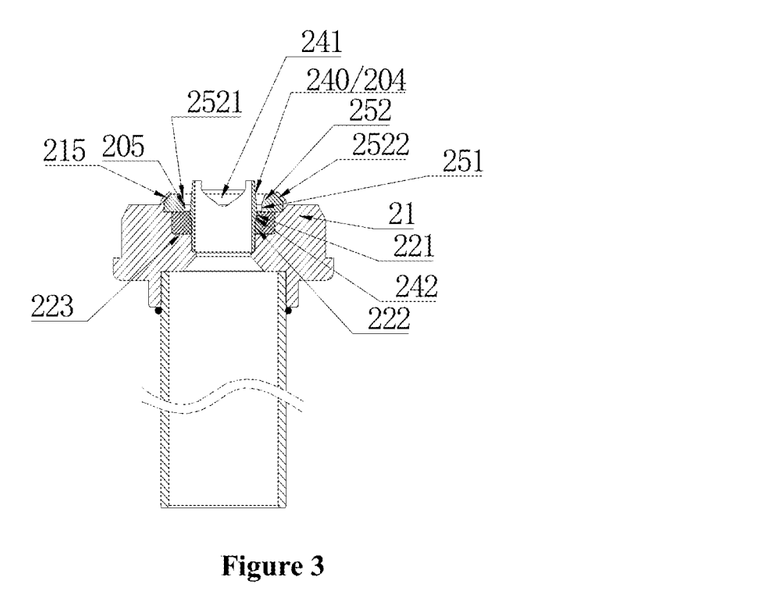
FIG. 3 is a schematic structural view of a valve seat component of the flow control valve shown in FIG. 1.
Figure 3A:
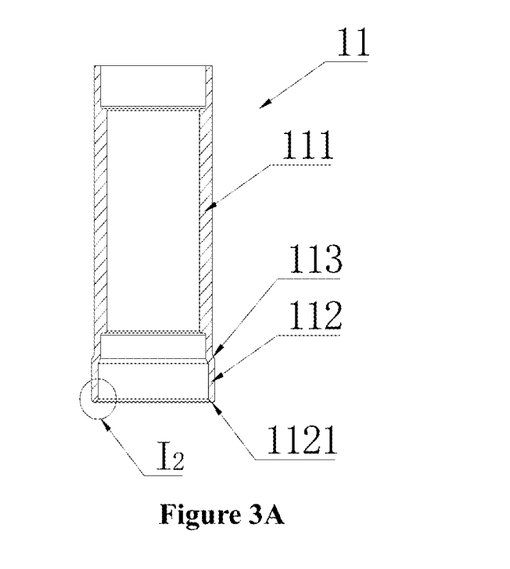
FIG. 3A is a schematic structural view of the valve core shown in FIG. 1.
Figure 4:
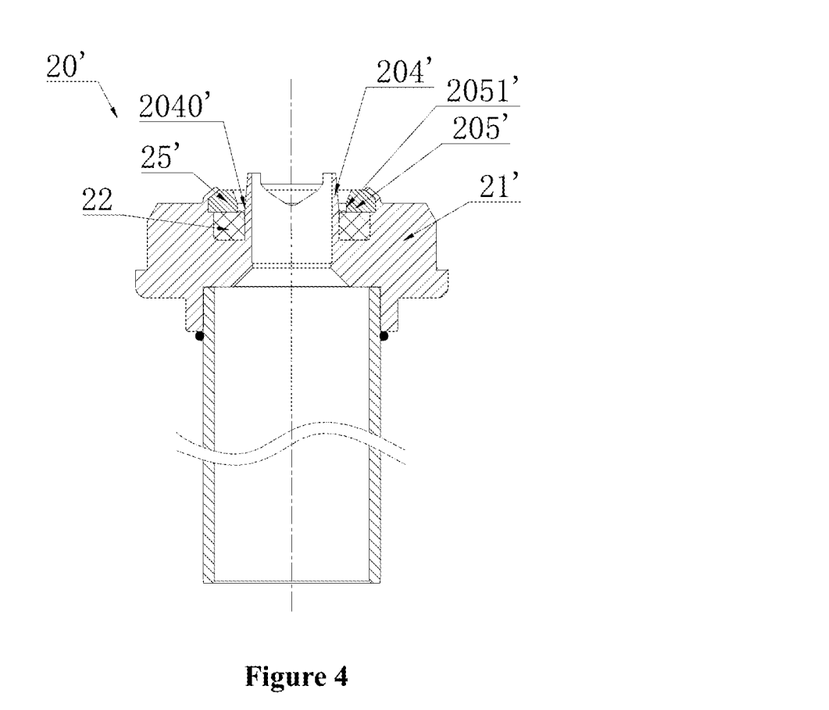
FIG. 4 is a schematic structural view of a modified embodiment of the valve seat component in FIG. 1.
Figure 5:
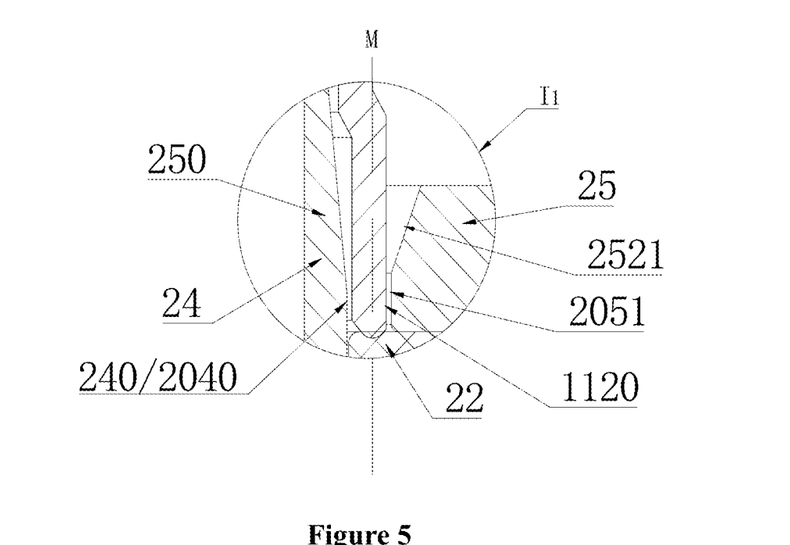
FIG. 5 is a partially enlarged view of a portion $I_1$ in FIG. 2.
Figure 6:
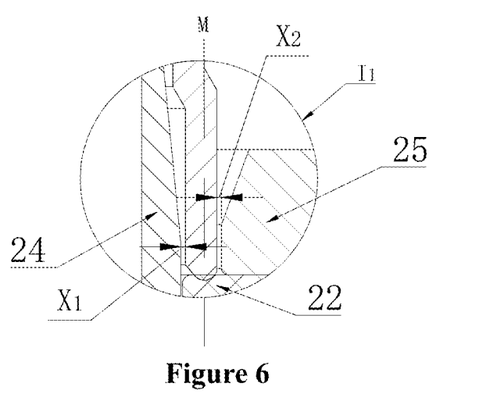
FIG. 6 is a partially enlarged view of the portion $I_1$ in FIG. 2.
Figure 7:
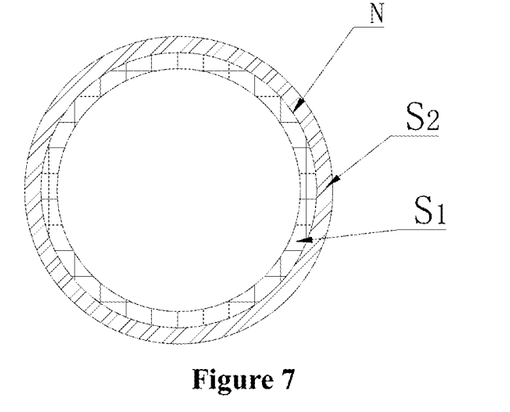
FIG. 7 is a schematic view showing a force area of the valve core in FIG. 6 on two sides of a sealed loop line.
Figure 8:
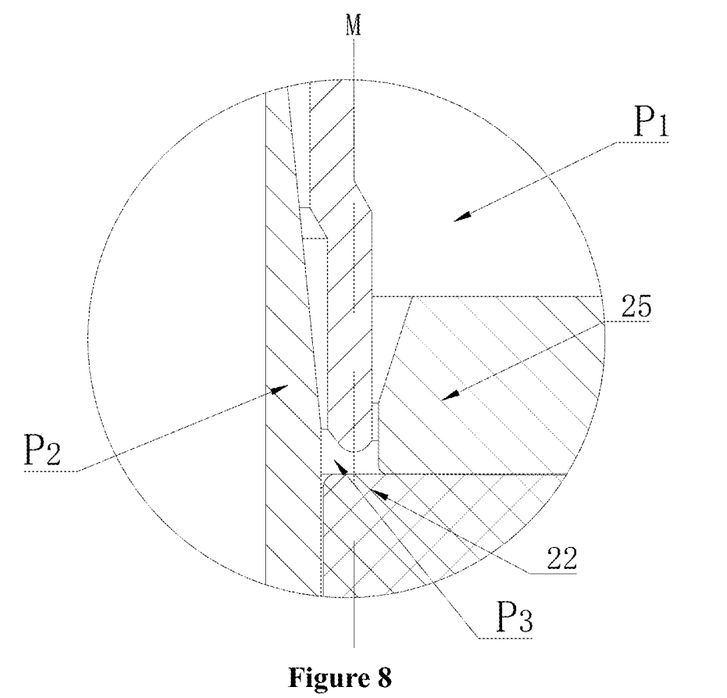
FIG. 8 is a schematic structural view when the valve core in FIG. 6 just leaves the sealed ring.
Figure 9A:
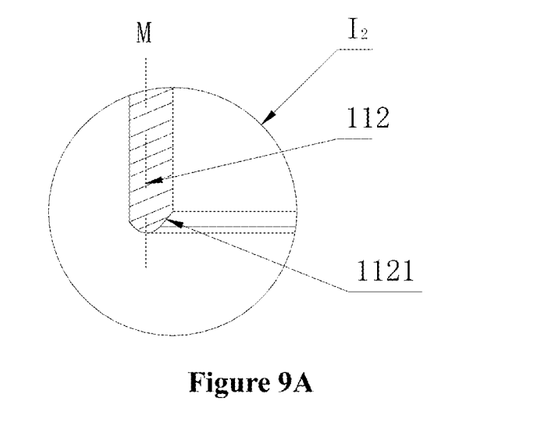
FIG. 9A is a partially enlarged view of a portion $I_2$ in FIG. 3A.
Figure 9B:
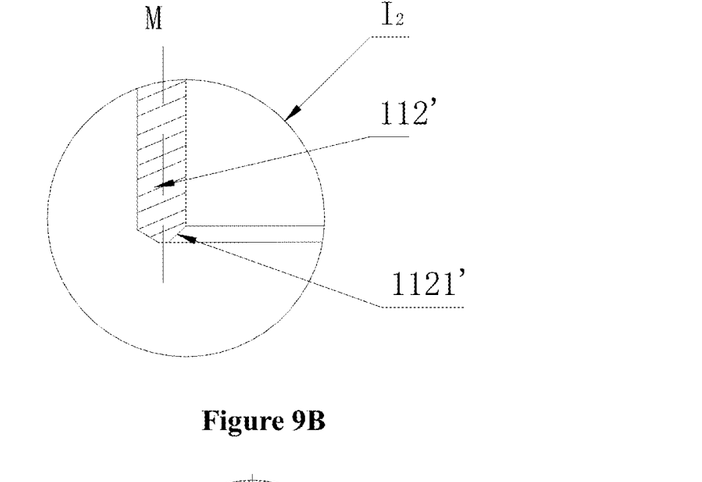
FIG. 9B is a partially enlarged view of a modified embodiment at the portion $I_2$ in FIG. 3A.

FIG. 1 is a schematic structural view of a first embodiment of a flow control valve according to the present application in a fully open state; FIG. 2 is a schematic structural view of the flow control valve shown in FIG. 1 when a valve core abuts against a sealed ring; FIG. 3 is a schematic structural view of a valve seat component of the flow control valve shown in FIG. 1; FIG. 3A is a schematic structural view of the valve core shown in FIG. 1; FIG. 4 is a schematic structural view of a modified embodiment of the valve seat component in FIG. 1; FIG. 5 is a partially enlarged view of a portion $I_1$ in FIG. 2; FIG. 6 is a partially enlarged view of the portion $I_1$ in FIG. 2; FIG. 7 is a schematic view showing a force area of the valve core in FIG. 6 on two sides of a sealed loop line; FIG. 8 is a schematic structural view when the valve core in FIG. 6 just leaves the sealed ring; FIG. 9A is a partially enlarged view of a portion $I_2$ in FIG. 3A; and FIG. 9B is a partially enlarged view of a modified embodiment at the portion $I_2$ in FIG. 3A.

As shown in FIGS. 1 and 2, the flow control valve according to the present application may be an electronic expansion valve, which includes a valve core component 10, a valve seat component 20, a transmission component 30, a valve body component 40, a guide component 60 and a coil component 70. The valve body component 40 is fixedly connected to the valve seat component 20, and the valve core component 10 is arranged in a valve chamber of the flow control valve.

The valve seat component 20 includes a sealed ring 22, a first annular protrusion and a second annular protrusion. The valve core component 10 includes a valve core 11, and the valve core includes a lower section portion 112 substantially in a shape of an annular.

In a case that the valve core 11 abuts against the sealed ring 22, the lower end portion of the lower section portion 112 is located between the first annular protrusion and the second annular protrusion 204. The first annular protrusion includes a first inner wall portion located at an outer side of the lower end portion and configured to be matched with the lower end portion, and the second annular protrusion includes a first outer wall portion located at an inner side of the lower end portion and configured to be matched with the lower end portion. In a case that the valve core 11 abuts against the sealed ring 22, the minimum inner diameter of the first inner wall portion is defined as $D_1$, the maximum outer diameter of the first outer wall portion is defined as $D_2$, the minimum inner diameter of the lower end portion is defined as $D_3$, and the maximum outer diameter of the lower end portion is defined as $D_4$, $D_3-D_2<2$ mm, and $D_1-D_4<2$ mm. Such a design is beneficial to balance the fluid pressure received by the valve core component 10, and reduce the pressure difference received by the valve core component 10, thereby improving the operational reliability of the flow control valve.

Specifically:

The valve body component 40 includes a valve body 41 and a valve cover body 42 which are fixedly connected with each other by welding. The coil component 70 is sleeved on a periphery of the valve cover body 42 and is fixedly connected to the valve body component 40 through a support 44. The valve body 41 is substantially in a structure of a cylinder, which may be manufactured by means of pressing/stamping/rolling/extrusion shaping in a specific processing process. The processing technology is simple and the production efficiency is high. The valve body 41 includes a first fluid port 419, and a first connecting pipe 43 is in communication with the first fluid port 419 and is fixed to an inner wall of the first fluid port 419 by welding. The valve cover body 42 is fixed to an outer wall of the valve body 41 by welding. It may be understood that the valve cover body 42 may also be indirectly fixed to the valve body 41 through welded joints. Other components may also be indirectly fixed by welding hereinafter, and will not be repeated here.

As shown in FIGS. 1 and 2, the transmission component 30 is arranged in the valve chamber of the flow control valve, and the transmission component 30 includes a magnet rotor 34, a connecting sheet 35, a threaded rod 31 and a threaded sleeve 32. The magnet rotor 34 is arranged in the valve cover body 42, which is fixedly connected to the threaded rod 31 through the connecting sheet 35, and the threaded rod 31 matches with the threaded sleeve 32 by screw threads.

The flow control valve of the present embodiment adjusts the flow of the flow control valve through the cooperation between the valve core component 10 and the valve seat component 20. As shown in FIGS. 1 and 2, the valve core component 10 includes an upper cylinder 12, a valve core 11 substantially in a shape of an annular and a connector 14 for connecting the upper cylinder 12 with the valve core 11. When the lower section portion 112 of the valve core 11 is separated from the sealed ring 22, the first connecting pipe 43 is in communication with a second connecting pipe 23. When the lower section portion 112 of the valve core 11 abuts against the sealed ring 22, the first connecting pipe 43 is not in communication with the second connecting pipe 23. It should be noted that, the "non-communication" or "close" described in the present application refers to an ideal state, does not exclude a situation that the first connecting pipe 43 is in communication with the second connecting pipe 23 due to the internal leakage caused by performance. The upper cylinder 12 includes a first chamber 2, and the upper cylinder 12 includes a transverse bent portion 121. A lower end face of the transverse bent portion 121 is used as an upper stop portion. Certainly, it can be understood from the disclosure that, the way for forming the upper stop portion is not limited thereto. For example, the upper stop portion may also be formed by welding an upper stop member on the upper cylinder 12. A first axial through hole 15 is formed on an inner edge of the upper stop portion, and the first axial through hole 15 is in communication with the first chamber 2. The threaded sleeve 32 is provided through the first axial through hole 15, and a radial protrusion 321 of the threaded sleeve 32 is arranged in the first chamber 2 and configured to be matched with the transverse bent portion 121 of the upper cylinder 12.

An outer diameter of the upper cylinder 12 is greater than an outer diameter of the valve core 11, that is, the upper cylinder 12 is wider than the valve core 11. The connector 14 is a substantially annular structure gradually narrowed toward the bottom. An upper end portion of the connector faces the first chamber 2, and the upper end portion of the connector includes a lower stop portion 143. When the valve core component 10 abuts against the sealed ring 22, a lower end of the threaded sleeve 32 can be matched with the lower stop portion 143 to limit the threaded sleeve 32 to continue to move downward relative to the valve core component 10. A lower end of the connector 14 faces a second chamber 3 (that is, an inner chamber of the valve core) of the valve core 11. The connector 14 is provided with a second axial through hole 4, and a cross section of the connector 14 is annular. The second axial through hole 4 is in communication with the first chamber 2 and the second chamber 3. The connector 14 is formed by metal cutting and includes an upper portion, a middle portion and a lower portion. An outer diameter of the upper portion is greater than an outer diameter of the middle portion, and the outer diameter of the middle portion is greater than an outer diameter of the lower portion. Then a first positioning stepped portion 141 with a stepped surface facing downward is formed on the outer wall of the upper portion and the middle portion of the connector 14, and a second positioning stepped portion 142 with a stepped surface facing downward is formed on the middle portion and the lower portion of the connector 14. An inner stepped portion with a stepped surface facing downward is arranged on an inner wall of the upper cylinder 12, and a downward pressing portion is arranged on a lower end of the upper cylinder 12. When the upper end of the connector 14 abuts against the inner stepped portion, the upper cylinder 12 is fixedly connected to the connector 14 by riveting the downward pressing portion to the first positioning stepped portion 141 or welding the downward pressing portion to the first positioning stepped portion 141. An upper end of the valve core 11 is sleeved on a periphery portion of the lower portion of the connector 14 and fixed to the lower portion of the connector 14 by welding after abutting against the second positioning stepped portion 142 of the connector 14.

The valve core 11 is formed by stretching or stamping of metal material. In order to simplify the machining processes, the valve core 11 may be further integrally formed by stretching or stamping of the metal material. For example, the valve core 11 is integrally formed by stamping a welded steel pipe or by stretching a steel plate. The machining process is simple and the cost is saved. As shown in FIGS. 1 to 3, after the valve seat component 20 is fixed to a lower opening of the valve body 41 by welding, the flow control valve has a valve chamber 416. The valve seat component 20 includes a valve seat body 21, the aforementioned sealed ring 22, an inner bushing 24 and an outer bushing 25. The valve seat body 21 includes an axial through hole 211 and a second fluid port 219, and a lower stepped portion 212 with a stepped surface facing downward is arranged on an inner wall of the valve seat body 21. A second connecting pipe 23 abuts against the lower stepped portion 212 for positioning and is fixed to the valve seat body 21 by welding, and the second connecting pipe 23 is in communication with the second fluid port 219. The inner bushing 24 is substantially in a shape of an annular, and the inner bushing 24 is at least partially arranged in the axial through hole 211. The inner bushing 24 is fixedly connected (for example, by welding or relatively fixed by interference fit) to the valve seat body 21, and the sealed ring 22 and the outer bushing 25 are arranged between an outer side of the inner bushing 24 and the valve seat body 21. The outer bushing 25 includes the aforementioned first annular protrusion 205, and the inner bushing 24 includes the aforementioned second annular protrusion 204. With such a design, the assembly of the valve seat component 20 is also convenient.

The flow control valve according to the present embodiment has a bidirectional flow function, that is, the fluid may flow in from the first connecting pipe 43 and flow out from the second connecting pipe 23 (referred to as a forward direction in the present application), or the fluid may also flow in from the second connecting pipe 23 and flow out from the first connecting pipe 43 (referred to as a reverse direction in the present application). When the fluid flows forward, in order to improve the bad action, that is, the valve core 11 cannot abut against the sealed ring 22, especially when the flow control valve is in a small opening (for example, a valve opening pulse is less than 20% of a valve fully open pulse), the adverse reaction of closing the valve is more apparent. Therefore, as shown in FIGS. 5 and 6, when the valve core 11 abuts against the sealed ring 22, a lower end portion 1120 of the lower section portion 112 is located between the first annular protrusion 205 and the second annular protrusion 204. The first annular protrusion 205 includes a first inner wall portion 2051 located at an outer side of the lower end portion 1120 and configured to be matched with the lower end portion 1120, and the second annular protrusion 204 includes a first outer wall portion 2040 located at an inner side of the lower end portion 1120 and configured to be matched with the lower end portion 1120. When the minimum inner diameter of the first inner wall portion 2051 is $D_1$, the maximum outer diameter of the first outer wall portion 2040 is $D_2$, the minimum inner diameter of the lower end portion 1120 is $D_3$, and the maximum outer diameter of the lower end portion 1120 is $D_4$, then $D_3-D_2<2$ mm, and $D_1-D_4<2$ mm.

In a specific design, in the present embodiment, the inner wall of the valve seat body 21 includes a radial flange 213. The lower end of the inner bushing 24 and a hole wall of the axial through hole 211 are in interference fit or further fixed by welding after the interference fit, so that the outer wall of the lower end of the inner bushing 24 generally fits with the hole wall of the axial through hole 211, and a lower end face of the inner bushing 24 abuts against the radial flange 213. The inner bushing 24 may be higher than a sealed component along the axial direction thereof. At the instant that the valve core component 10 leaves the sealed ring 22 to open the flow control valve, a higher portion of the inner bushing 24 can block the instantaneous impact of high-pressure fluid, making the process of opening the valve stable.

A portion that is higher than the sealed ring 22 in the axial direction of the inner bushing 24 is used as the second annular protrusion 204. The outer wall of the second annular protrusion 204 includes an equal-diameter portion 240 and a diameter reducing portion 250 located above the equal-diameter portion in the axial direction. The outer diameter of the diameter reducing portion 250 is less than the outer diameter of the equal-diameter portion 240. At this time, the outer wall of the equal-diameter portion 240 is used as a first outer wall portion 2040 of the present embodiment, so that the first outer wall portion 2040 can be matched with the lower end portion 1120 of the lower section portion. In the process of the valve core component 10 moving from an upward side of the inner bushing 24 toward the sealed ring 22, the diameter reducing portion 240 of the inner bushing 24 can guide the valve core 11 of the valve core component 10, and improve the interference between the valve core 11 and the inner bushing 24. In addition, when the valve core 11 moves to the peripheral portion of the inner bushing 24, the space between the diameter reducing portion 240 of the inner bushing and the valve core 11 can further play a role in flow regulation.

As a further design, the inner bushing 24 further includes a notch 241 which is arranged on the second annular protrusion 204. The specific shape of the notch 241 is not limited. As long as the notch can be matched with the valve core component 10 to adjust the flow of the flow control valve, that is, as long as the notch can regulate the flow between the first fluid port 419 and the second fluid port 219. For example, as shown in FIG. 1, the notch 214 may be substantially V-shaped with an opening increasing upward from the bottom of the notch 241, or may also be an inclined cutout.

The valve seat body 21 is provided with a first upper stepped portion 214 with a stepped surface facing upward. The sealed ring 22 is substantially in a shape of an annular with a middle through hole and a concave-shaped longitudinal section. The sealed ring 22 is arranged on the periphery of the inner bushing 24 and is arranged on the first upper stepped portion 214. The inner wall of the sealed ring 22 abuts against the outer wall of the inner bushing 24. The sealed ring 22 may be made of a non-metallic soft material, for example, plastic material, which is easy to guarantee the sealing performance between the sealed ring and the valve core component 10 made of metal (a steel plate in the present embodiment).

As a further detailed design, the sealed ring 22 includes an upper section portion 251 and a lower section portion 222. An inner diameter of the upper section portion 251 is greater than an inner diameter of the lower section 222, thus forming a sealed ring stepped portion 223 with a stepped surface facing upward on the inner wall of the sealed ring 22. Accordingly, the inner bushing 24 includes an inner bushing stepped portion 242 matched with the sealed ring stepped portion 223, and the inner bushing stepped portion 242 is formed on the outer wall of the inner bushing 24 and has a stepped face facing downward. At an inner end of the sealed ring 22, the inner bushing stepped portion 242 is matched with the sealed ring stepped portion 223 to press the sealed ring 22 toward the valve seat body 21. At an outer end of the sealed ring 22, the outer bushing 25 is arranged above the sealed ring 22. An outer edge diameter of the outer bushing 25 is roughly equal to an outer edge diameter of the sealed ring 22, or the outer edge diameter of the outer bushing 25 is greater than an outer edge diameter of the sealed ring 22. A riveting portion 215 is provided at an upper end of the valve seat body 21, and the riveting portion 215 is specifically a protrusion formed by extending upward along the upper end of the valve seat body 21 when the valve seat body 21 is processed. Or, according to FIG. 4, it can be understood that the valve seat body 21 may also be fixed to the outer bushing 25 by welding.

According to the flow control valve of the present embodiment, the outer bushing 25 and the inner bushing 24 can jointly press the sealed ring 22 on the first upper stepped portion 214 of the valve seat body 21. Such a structural design can effectively prevent the sealed ring 22 from being separated from the valve seat body 21, and further make a lower surface of the sealed ring 22 be fully matched with the stepped surface of the first upper stepped portion 214, so as to make the lower end surface of the sealed ring 22 fits with the first upper stepped surface of the first upper stepped portion 214 as much as possible. When the flow control valve needs to be closed, it is beneficial to improve the internal leakage of the flow control valve. Furthermore, the valve seat body includes a second upper stepped portion 216 with a stepped surface facing upward, the inner diameter of a stepped wall of the second upper stepped portion 216 is greater than the inner diameter of the stepped wall of the first upper stepped portion 214, and the outer bushing is arranged on the second upper stepped portion 216. With such an arrangement, in the process of riveting the outer bushing 25 by the riveting portion 215, the second upper stepped portion 216 may bear most of the force on the sealed ring 22 during the riveting process, so as to improve the effect on the deformation of the sealed ring 22 during riveting.

As shown in FIGS. 1 and 3, the outer bushing 25 includes a base portion 251 and a diameter enlarging portion 252 located above the base portion 251. The inner diameter of the base portion is substantially equal to the outer diameter of the base portion 251, and the inner wall of the base portion 251 forms the aforementioned first inner wall portion 2051. The inner diameter of the diameter enlarging portion 252 increases from being close to the base portion 251 to being away from the base portion 251, that is, the inner diameter of the diameter enlarging portion 252 is greater than the inner diameter of the base portion 251. Such a structure make the inner wall of the diameter enlarging portion 252 form a first inclined surface 2521. When the lower section portion 112 abuts against the sealed ring 22, a diversion space is formed between the outer wall of the lower section portion 112 and the inner wall of the diameter enlarging portion 252, and a flow area of the diversion space increases toward the direction away from the sealed ring 22. When the valve core 11 moves upward along the axial direction from a state that the lower section portion 112 of the valve core 11 abuts against the sealed ring 22 until the lower section portion 112 is matched with the first inclined surface 2521, the lower section portion 112 of the valve core 11 is matched with the first inclined surface 2521 to adjust the flow at a small opening, which has a more obviously beneficial effect when an aperture of the flow control valve is small, and other groove/port adjusting structure cannot be arranged, thereby simplifying the structural design. The outer wall of the diameter enlarging portion 252 is provided with a second inclined surface 2522 which is arranged in a reduced diameter to facilitate matching with the riveting portion 215 of the valve seat body 2.

It can be seen that according to the valve seat component in the present solution, the structure of each components is simple, the assembly is convenient, and the sealed ring is fixed and reliable, which is beneficial to improve the internal leakage of the flow control valve.

As a modified embodiment, as shown in FIG. 4, a valve seat component 20' includes a valve seat body 21' and an outer bushing 25', and the valve seat body includes an axial through hole and an annular groove 211'. The sealed ring 22' is arranged in the annular groove 211', and the valve seat body 21' directly forms a second annular protrusion 204', that is, the second annular protrusion 204' is integrally formed with the valve seat body 21'. The second annular protrusion 204' is formed by extending substantially upward from a first wall portion 2111' of the annular groove 211'. The second annular protrusion 204' includes a first outer wall portion 2040', and the outer bushing 25' is arranged on an upper side of the sealed ring 22'. The outer bushing 25' includes a first annular protrusion 205', and the first annular protrusion 205' includes a first inner wall portion 2051'. The technical effect and other structures of the present embodiment are the same as those in the aforementioned embodiment, and will not be repeated here.

It can be known according to the aforementioned structural design, the valve core component 10 includes a flow balancing path. The valve chamber 416 includes an upper chamber 416A located above the valve core member 10. When the valve core 11 abuts against the sealed ring 22, the upper chamber 416A is not in communication with the first fluid port 419, and the upper chamber 416A is in communication with a second fluid port 219 through the flow balancing path. The flow balancing path includes a lower opening portion of the valve core 11, the second chamber 3, a second axial through hole 4 of the connector 14, the first chamber 2 and the first axial through hole 15 of the upper cylinder 12. The arrangement of the flow balancing path is beneficial to reduce the pressure difference received by the valve core component 10.

As shown in FIG. 1, in order to ensure that the valve core component 10 does not deviate axially during the axial movement of the threaded sleeve 32, in the valve chamber 416, the guide component 60 for guiding the valve core component 10 is arranged on the peripheral portion of the valve core component 10. The guide component 60 includes a guide sleeve 61, and the guide sleeve 61 is fixed to a lower cylinder portion of the valve body 41 by welding.

In practice, the guide sleeve 61 is an annular structure and includes a guide section in clearance sliding fit with an outer wall of the upper cylinder 12 to guide the upper cylinder 12 and an installation section located under the guide section. Specifically, an inner wall of the guide section acts as a guide surface to be in clearance fit with the upper cylinder 12 to guide the valve core component 10. The installation section is used to limit the position of the sealed component 63. The sealed component 63 is matched with the valve core 11 and the guide sleeve 61.

In further design, as shown in FIGS. 2, 5 and 6, the valve core 11 includes a body portion 111 and a lower section portion 112 arranged under the body portion 111. The outer diameter of the lower section portion 112 is greater than the outer diameter of the body portion 111, the inner diameter of the lower section portion 112 is greater than the inner diameter of the body portion 111, and the inner diameter of the lower section portion 112 is less than the outer diameter of the body portion 111, and the lower section portion 112 can abut against or be separated from the upper end face of the sealed ring 22. In a cross sectional direction of the lower end portion 1120, the minimum gap between the outer wall of the lower end portion 1120 and the first inner wall portion 2051 of the outer bushing 25 is defined as $X_2$, $X_2=(D_3-D_2)$, and the minimum gap between the inner wall of the lower section portion 112 and the second outer wall portion 2040 of the inner bushing 24 is defined as $X_1$, and $X_1=(D_1-D_4)$. The present solution does not exclude the situation that $X_1$ or $X_2$ is equal to zero due to processing or operation.

A sealed loop line is formed at a portion where the outer wall of the body portion 111 is in contact with the sealed component. As shown in FIGS. 1, 7 and 8, a projection loop line of an outer wall M of the body portion 111 in the horizontal direction is defined as N (that is, the projection of the sealed loop line in the horizontal direction). With such a design, when the fluid flows forward and the valve core 11 is in the position shown in FIG. 8, the force F subjected to the valve core 11 includes an upward force $F_\uparrow$ located inside the projection loop line N and a downward force $F_\downarrow$ located outside the projection loop line. The pressure of the fluid flowing from the first connecting pipe 43 into the valve chamber 416 is high, which is referred to as a high pressure zone $P_1$, and the pressure is C MPa. A third chamber 3 of the valve core 11 is always in communication with the second connecting pipe 43 (that is, an outlet connecting pipe in the forward flow), the pressure is low, which is referred to as a low pressure zone $P_2$, and the pressure is A MPa. It can be seen that, when the flow control valve is applied in the system, the values of C and A are basically unchanged. The pressure of a zone $P_3$ between the lower end of the valve core 11 and the sealed ring 22 is B MPa, the force area of the valve core 11 on the left side of the projection loop line N is $S_1$, and the force area of the valve core 11 on the right side of the projection loop line N is $S_2$, then the force of the valve core 11 is $F=F_\uparrow+F_\downarrow=(B-A)*S_1+(C-B)*S_2$.

When the minimum gap $X_2$ between the outer wall of the lower end portion 1120 and the first inner wall portion 2051 of the outer bushing 25 is too large, the values of C and B are nearly equal, then the value of B must be greater than the value of A, then the fluid pressure difference received by the valve core 11 is $F=(B-A)*S_1>0$, the force direction is upward, that is, the valve core 11 is affected by the upward force of the fluid, which is not conducive to close the valve. Therefore, in order to make the fluid pressure on two sides of the projection loop line N of the valve core 11 be nearly equal, the resultant force of the fluid pressure received by the valve core 11 tends to 0, so as to balance the fluid pressure received by the valve core 11 as much as possible, then $F=F_\uparrow+F_\downarrow=(B-A)*S_1+(C-B)*S_2$ should tend to 0. After the flow control valve is assembled, the dimensions of the maximum outer diameter $D_2$ and the minimum inner diameter $D_1$ of the lower end portion 1120 of the valve core 11 are unchanged, and correspondingly the dimensions of $S_1$ and $S_2$ are unchanged. And the valves of C and A in the system are also unchanged or little changed, at this time, in order to make the force F of the valve core 11 tend to 0, the value of B is adjusted. In order to adjust the value of B, it can be achieved by adjusting the size of the minimum gap $X_2$ (that is, $D_1-D_4$) between the outer wall of the lower end portion 1120 and the first inner wall portion 2051 of the outer bushing 25 to control the flow area between the outer wall of the lower end portion 1120 and the first inner wall portion 2051 of the outer bushing 25. When the inner bushing 24 and the outer bushing 25 are processed well, the dimensions of the first outer wall portion 2040 and the first inner wall portion 2051 are determined. If $X_2$ increases, the value of B correspondingly increases, and $X_1$ correspondingly decreases; otherwise, if $X_2$ decreases, the value of B correspondingly decreases and $X_1$ correspondingly increases. The larger the minimum gap $X_2$ between the outer wall of the lower end portion 1120 and the first inner wall portion 2051 of the outer bushing 25, the closer the value of B is to the value of C until the value of B is close to the value of C, and the larger the value of B, the more unfavorable the valve closing action of the flow control valve. Therefore, $X_2$ should not be too large, and should be controlled within $X_2<2$ mm, and $X_2$ should also not be too small. If $X_2$ is too small, then the outer bushing 25 may interfere with the valve core 11 during the downward movement of the valve core 11, therefore, $X_2>0.05$ mm can be controlled as far as possible. Similarly, in order to avoid the interference between the inner bushing 24 and the valve core 11, $X_1>0.05$ mm can be controlled as far as possible.

According to the flow control valve of the present embodiment, through the above structural design, when the fluid flows forward, the differential pressure force received by the valve core 11 can be adjusted by adjusting the size of $X_1$ and $X_2$ without changing the structure and size of the valve core 11, and the differential pressure force received by the valve core 11 can be reduced to improve the valve closing reliability of the valve core 11 and improve the operational performance of the flow control valve.

If the size of $X_1$ and $X_2$ needs to be adjusted, it can be achieved by adjusting the inner diameter and outer diameter of the lower end portion 1120 without changing the structure of other components, which is convenient to realize and easy to control in process.

The valve core component 10 further includes a transition portion 113, one end of the transition portion 113 is connected to the body portion 111, and the other end of the transition portion is connected to the lower section portion 112. The inner wall of the transition portion 113 and the outer wall of the transition portion 113 are tapered with a small upper portion and a large lower portion, which is more convenient for the processing of the lower section portion 112.

In order to further ensure the sealing performance, a bottom surface 1121 of the lower section portion 112 has a longitudinal section profile that is substantially arc-shaped shown in FIG. 9A. The projection loop line N (that is, the projection of the sealed loop line in the horizontal direction) of the outer wall of the body portion 111 of the valve core 11 in the horizontal direction is substantially coincident with the loop line where the bottom surface 1121 of the lower end portion 112 is located, which is equivalent to that if the outer wall of the body portion 111 is extended downward, it can substantially coincide with the loop line of the bottom surface 1121, so that the pressure difference of the valve core 11 subjected to the fluid is as little as possible, and the operation of opening and closing the valve is smoother and easier to realize.

In an alternative solution, as shown in FIG. 9B, when a bottom surface 1121' of a lower section portion 112' is a truncated cone structure that the diameter is tapered (that is, a large upper portion and a small lower portion) in the direction of the sealed ring 22, the projection loop line N (that is the projection of the sealed loop line in the horizontal direction) of the outer wall of the body portion 111 of the valve core 11 in the horizontal direction is located on the bottom surface 1121'.

The situation that the fluid flows in from the first connecting pipe 43 and flows out from the second connecting pipe 23 is taken as an example for illustration. A magnetic rotor 34 may rotate clockwise or anticlockwise driven by the coil component 70, thus driving the threaded sleeve 32 to move axially. It may be configured as follows: the valve core component 10 trends to move toward the sealed ring 22 when the magnetic rotor 34 rotates clockwise, and the valve core component 10 moves away from the sealed ring 22 when the magnetic rotor 34 rotates anticlockwise. When the flow control valve is in the fully open state as shown in FIG. 1, the valve core component 10 is restricted by a valve core limiting portion 52 and cannot continue to move upward along the axial direction. The coil component 70 is energized to make the magnetic rotor 34 rotate clockwise. The circumferential rotation of the magnetic rotor 34 is transformed into the axial movement of the threaded sleeve 32 through the threaded rod 31, so that the threaded sleeve 32 drives the valve core component 10 to move downward to make the valve core abut against the sealed ring 22, that is, the flow control valve is in a valve closed state. During the operation of the flow control valve, after the flow control valve is powered off, the torque of the magnetic rotor 34 is transmitted to the threaded sleeve 32 and the valve core component 10 through the threaded rod 31, so as to maintain the position of the valve core component 10. However, in the practical operation of the flow control valve, the transmission thread between the threaded rod 31 and the threaded sleeve 32 may slip due to vibration and other reasons, resulting in the failure of the locking force transmitted by the threaded rod 31 to the threaded sleeve 32 and the valve core component 10, and resulting in leakage problem due to the failure to effectively close the valve.

For avoiding this problem, the threaded sleeve 32 further includes a lower extended portion 322 arranged in the first chamber 2. The lower extended portion 322 is annular and includes an accommodating chamber 323. An elastic component is provided in the accommodating chamber 323, an end of the elastic component abuts against the valve core component 10, and the other end of the elastic component abuts against the threaded sleeve 32. In the present embodiment, the elastic component is a compressed spring 33. In order to filter the fluid in the flow control valve, a filter component 13 is further installed at the position of the second axial through hole of the connector 14.

When the valve needs to be opened, the coil component 70 is energized to make the magnetic rotor 34 rotate anticlockwise. A radial protrusion 321 of the threaded sleeve 32 abuts against the upper stop portion of the valve core 11, so that the threaded sleeve 32 can move upward with the valve core portion 10 along the axial direction until the transverse bent portion 121 of the valve core component 10 abuts against a valve core limiting portion 52 of a sleeve member 50, so as to achieve the valve fully open state shown in FIG. 1.

Figure 10:
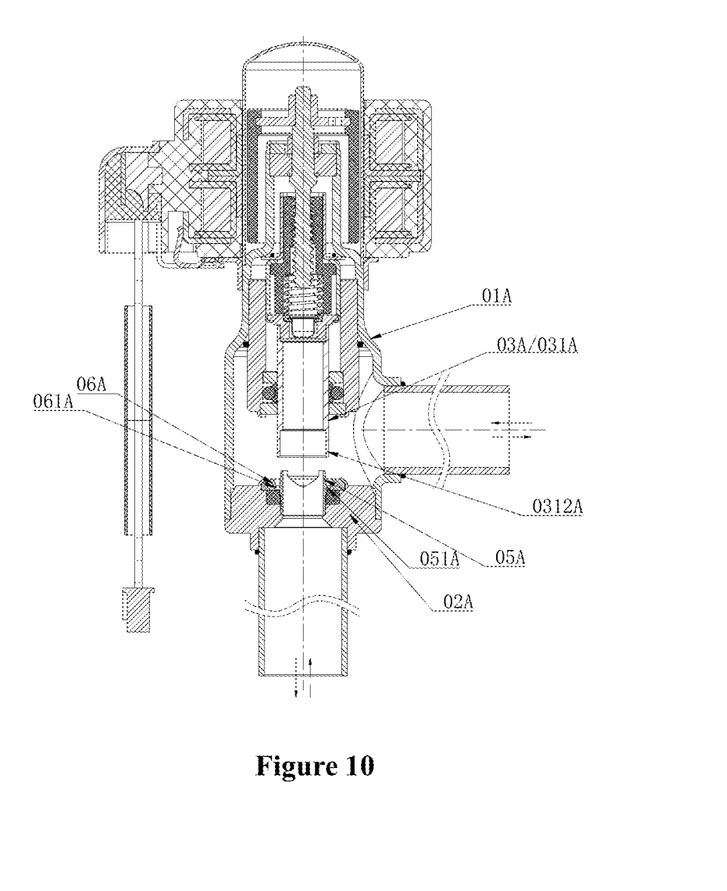
FIG. 10 is a schematic structural view of a second embodiment of the flow control valve according to the present application.

FIG. 10 is a schematic structural view of a second embodiment of the flow control valve according to the present application.

In the present embodiment, the flow control valve is embodied as an electronic expansion valve, which differs from the above embodiment only in that the specific structure of the valve core is slightly different. As shown in FIG. 10, the outer diameter of the valve core is substantially equal, that is, the outer diameter of the lower section portion of the valve core and other portions of the valve core are substantially the same, rather than the structure that the outer diameter of the lower section portion is greater than the outer diameter of the body portion in the above embodiment. The flow control valve of the present embodiment can also realize the object of the present application, which includes a valve body component 01A, a valve seat component 02A and a valve core component 03A; the valve body component 01 is fixedly connected to the valve seat component 02A, the valve core component 03A is arranged in a valve chamber of the flow control valve. The valve core component 03A includes a valve core 031A. The valve core 031A includes a lower section portion 0311A substantially in a shape of an annular. The valve seat component 02A includes a sealed ring 04A, a first annular protrusion 06A and a second annular protrusion 05A, and when the valve core 031A abuts against the sealed ring 04A, a lower end portion 0312A of the lower section portion 0311A is located between the first annular protrusion 06A and the second annular protrusion 05A. The first annular protrusion 06A includes a first inner wall portion 061A which is located on an outer side of the lower end portion 0312A and configured to be matched with the lower end portion 0312A, and the second annular protrusion 05A includes a first outer wall portion 051A which is located on the inner side of the lower end portion 0312A and configured to be matched with the lower end portion 0312A. When the valve core 031A abuts against the sealed ring 04A, the minimum inner diameter of the first inner wall portion 061A is defined as $D_1$, the maximum outer diameter of the first outer wall portion 051A is defined as $D_2$, the minimum inner diameter of the lower end portion 0312A is defined as $D_3$, and the maximum outer diameter of the lower end portion 0312A is defined as $D_4$, $D_3-D_2<2$ mm, and $D_1-D_4<2$ mm. Others may refer to the above embodiment, which is not repeated here.

Figure 11:
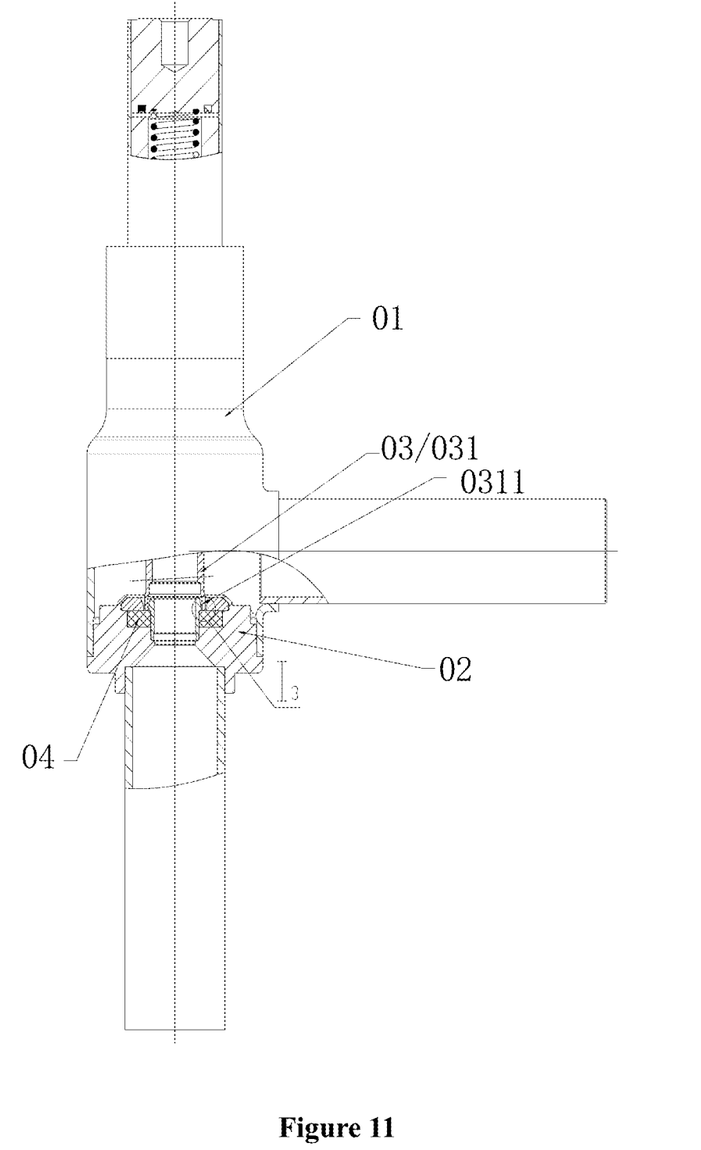
FIG. 11 is a schematic structural view of a third embodiment of the flow control valve according to the present application.
Figure 12:
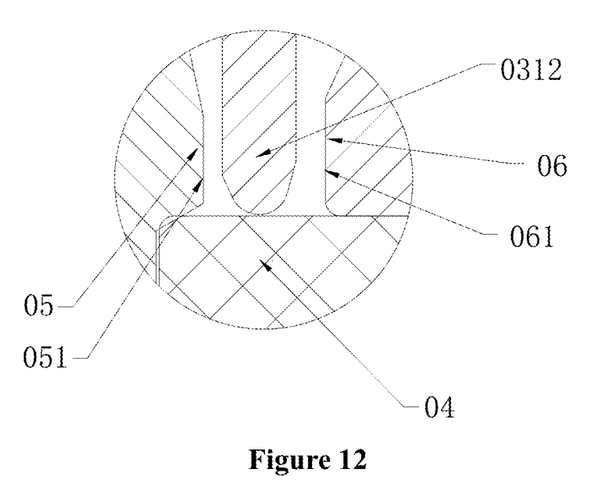
FIG. 12 is a partially enlarged view of a portion $I_3$ in FIG. 11.

FIG. 11 is a schematic structural view of a third embodiment of the flow control valve according to the present application. FIG. 12 is a partially enlarged view of a portion $I_3$ in FIG. 11. In the present embodiment, the flow control valve is embodied as a solenoid valve, which includes an electromagnetic coil (not shown), a valve body component 01, a valve seat component 02 and a valve core component 03; the valve body component 01 is fixedly connected to the valve seat component 02 by welding, the valve core component 03 is arranged in the valve chamber of the flow control valve. The valve seat component 02 includes a sealed ring 04, a first annular protrusion 06, a second annular protrusion 05, and the valve core component 03 includes a valve core 031. The valve core 031 includes a lower section portion 0311 substantially in a shape of an annular. When the valve core 031 abuts against the sealed ring 04, the lower end portion 0312 of the lower section portion 0311 is located between the first annular protrusion 06 and the second annular protrusion 05. The first annular protrusion 06 includes a first inner wall portion 061 which is located on an outer side of the lower end portion 0312 and configured to be matched with the lower end portion 0312, and the second annular protrusion 05 includes a first outer wall portion 051 which is located on the inner side of the lower end portion 0312 and configured to be matched with the lower end portion 0312. When the valve core 031 abuts against the sealed ring 04, the minimum inner diameter of the first inner wall portion 061 is defined as $D_1$, the maximum outer diameter of the first outer wall portion 051 is defined as $D_2$, the minimum inner diameter of the lower end portion 0312 is defined as $D_3$, and the maximum outer diameter of the lower end portion 0312 is defined as $D_4$, $D_3-D_2<2$ mm, and $D_1-D_4<2$ mm. The detailed structure of each component of the valve seat component 04 may be designed and understood with reference to the first embodiment, which will not be repeated here.

The flow control valve with the solenoid valve structure in the present embodiment can also realize the object of the present application. The specific principle thereof can be understood with reference to the first embodiment and will not be repeated. The structure of each component in the valve seat component is the same as that in the first embodiment and will not be repeated.

It should be noted that in addition to the electronic expansion valve and the solenoid valve flow control valve described in detail above, the flow control valve of the present patent technical solution may also be a proportional control valve of the flow regulation type or an electric control valve of the switch type. (It should be noted that in this application, the first annular protrusion and the second annular protrusion refer to a portion protruded upward by a surface opposite to the sealed ring and used to abut against the valve core in the axial direction when the valve core abuts against the sealed ring, and the specific mode for forming the first annular protrusion and the second annular protrusion is not limited.)

The flow control valve according to the present application is described in detail hereinbefore. The principle and the embodiments of the present application are illustrated herein by specific examples. The above description of examples is only intended to help the understanding of the method and spirit of the present application. It should be noted that, for those skilled in the art, many modifications and improvements may be made to the present application without departing from the principle of the present application, and these modifications and improvements are also deemed to fall into the protection scope of the present application defined by the claims.

What is claimed is:

1. A flow control valve, comprising:
a valve body component;
a valve seat component; and
a valve core component; wherein, the valve body component is fixedly connected to the valve seat component, the valve core component is arranged in a valve chamber of the flow control valve, the valve seat component comprises a sealed ring, a first annular protrusion and a second annular protrusion, and the valve core component comprises a valve core, and the valve core comprises a lower section portion substantially in a shape of an annular;
in a case that the valve core abuts against the sealed ring, a lower end portion of the lower section portion is located between the first annular protrusion and the second annular protrusion; the first annular protrusion comprises a first inner wall portion located at an outer side of the lower end portion and configured to be matched with the lower end portion, and the second annular protrusion comprises a first outer wall portion located at an inner side of the lower end portion and configured to be matched with the lower end portion; and in the case that the valve core abuts against the sealed ring, a minimum inner diameter of the first inner wall portion is defined as $D_1$, a maximum outer diameter of the first outer wall portion is defined as $D_2$, a minimum inner diameter of the lower end portion is defined as $D_3$, and a maximum outer diameter of the lower end portion is defined as $D_4$, $D_3-D_2<2$ mm, and $D_1-D_4<2$ mm.

2. The flow control valve according to claim 1, wherein, the valve core further comprises a body portion substantially in a shape of an annular, the lower section portion is arranged under the body portion, an outer diameter of the lower section portion is greater than an outer diameter of the body portion, an inner diameter of the lower section portion is greater than an inner diameter of the body portion, and the inner diameter of the lower section portion is less than the outer diameter of the body portion.

3. The flow control valve according to claim 2, wherein, the valve core further comprises a transition portion, an end of the transition portion is connected to the body portion, and the other end of the transition portion is connected to the lower section portion, the inner wall of the transition portion and the outer wall of the transition portion are of a tapered shape with a small upper portion and a large lower portion.

4. The flow control valve according to claim 1, wherein, the valve seat component further comprises a valve seat body, an inner bushing and an outer bushing, the valve seat body comprises an axial through hole, the inner bushing is at least partially arranged in the axial through hole, the sealed ring and the outer bushing are arranged between an outer side of the inner bushing and the valve seat body, the outer bushing comprises the first annular protrusion, and the inner bushing comprises the second annular protrusion.

5. The flow control valve according to claim 4, wherein, the valve seat body is fixed to the outer bushing by riveting, the outer bushing comprises a base portion abutted against the sealed ring and a diameter enlarging portion arranged above the base portion, an inner diameter of the diameter enlarging portion is greater than an inner diameter of the base portion, and the base portion comprises the first inner wall portion; when the lower section portion abuts against the sealed ring, a diversion space is formed between the outer wall of the lower section portion and the inner wall of the diameter enlarging portion, and a flow area of the diversion space increases toward the direction away from the sealed ring.

6. The flow control valve according to claim 4, wherein, a portion of the inner bushing that is higher than the sealed ring in an axial direction of the inner bushing is used as the second annular protrusion, the outer wall of the second annular protrusion comprises an equal-diameter portion arranged in the axial direction and a diameter reducing portion located above the equal-diameter portion, an outer diameter of the diameter reducing portion is less than an outer diameter of the equal-diameter portion, and an outer wall of the equal-diameter portion comprises the first outer wall portion.

7. The flow control valve according to claim 4, wherein, the valve seat body comprises a first upper stepped portion with a stepped surface facing upward, the sealed ring is arranged on the first upper stepped portion, the outer bushing is arranged on an upper side of the sealed ring, the inner bushing comprises an inner bushing stepped portion with a stepped surface facing downward, the inner wall of the sealed ring comprises a sealed ring stepped portion with a stepped surface facing upward, and the sealed ring stepped portion abuts against the inner bushing stepped portion.

8. The flow control valve according to claim 7, wherein, the valve seat body comprises a second upper stepped portion with a stepped surface facing upward, an inner diameter of a stepped wall of the second upper stepped portion is greater than an inner diameter of a stepped wall of the first stepped portion, and the outer bushing is partially arranged on the second upper stepped portion.

9. The flow control valve according to claim 4, wherein, the inner bushing comprises a notch, and the valve core is configured to be matched with the notch to adjust a flow of the flow control valve.

10. The flow control valve according to claim 4, wherein, the valve seat body is fixed to the outer bushing by welding, the outer bushing comprises a base portion abutted against the sealed ring and an diameter enlarging portion arranged above the base portion, an inner diameter of the diameter enlarging portion is greater than an inner diameter of the base portion, and the base portion comprises the first inner wall portion; in the case that the lower section portion abuts against the sealed ring, a diversion space is formed between the outer wall of the lower section portion and the inner wall of the diameter enlarging portion, and a flow area of the diversion space increases toward a direction away from the sealed ring.

11. The flow control valve according to claim 1, wherein, the valve seat component further comprises a valve seat body and an outer bushing, the valve seat body comprises an axial through hole and an annular groove, the valve seat body comprises the second annular protrusion, the sealed ring is arranged in the groove, the outer bushing is arranged on the outer side of the second annular protrusion and located above the sealed ring, and the outer bushing comprises the first annular protrusion.

12. The flow control valve according to claim 11, wherein, the second annular protrusion comprises a notch, and the valve core is configured to be matched with the notch to adjust a flow of the flow control valve.

13. The flow control valve according to claim 1, wherein, the valve body component comprises a first fluid port, the valve seat component comprises a second fluid port, the valve chamber comprises an upper chamber located above the valve core component, and the valve core component comprises a flow balancing path; in the case that the valve core abuts against the sealed ring, the upper chamber is not in communication with the first fluid port, and the upper chamber is in communication with the second fluid port through the flow balancing path.

14. The flow control valve according to claim 13, wherein, the valve core component further comprises an upper cylinder and a connector fixedly connected to the upper cylinder and the valve core; the upper cylinder comprises a first chamber, an upper end of the upper cylinder comprises a first axial through hole, the connector comprises a second axial through hole, the valve core comprises a second chamber; the flow balancing path comprises the second chamber, the second axial through hole, the first chamber and the first axial through hole.

15. The flow control valve according to claim 13, further comprising a guide component, wherein, the guide component comprises a guide sleeve, the guide sleeve is substantially in a shape of a cylinder, and the guide sleeve is fixedly connected to the valve body component; an outer wall of the upper cylinder is in clearance sliding fit with an inner wall of the guide sleeve, the valve core is substantially in a shape of a cylinder, the outer diameter of the upper cylinder is greater than the outer diameter of the valve core, a sealed component is arranged between the inner wall of the guide sleeve and the outer wall of the body portion, and a sealed loop line is formed at a portion where the outer wall of the body portion is in contact with the sealed component.

16. The flow control valve according to claim 15, wherein, the sealed ring is made of plastics, a longitudinal section profile of a lower end of the lower section portion is arc-shaped, and a projection of the sealed loop line in the horizontal direction is located on a bottom surface of the lower end portion.

17. The flow control valve according to claim 15, wherein, the sealed ring is made of plastics, a lower end of the lower section portion is of a truncated cone structure, and a projection of the sealed loop line in the horizontal direction is located on a bottom surface of the lower end portion.

18. The flow control valve according to claim 1, wherein, the valve seat component further comprises a valve seat body, an inner bushing and an outer bushing, and the valve seat body comprises an axial through hole and an annular groove, the inner bushing is at least partially arranged in the axial through hole, the sealed ring is arranged on the groove, the outer bushing is arranged on an outer side of the second annular protrusion and located above the sealed ring, the outer bushing comprises the first annular protrusion, the inner bushing comprises the second annular protrusion, the valve body component comprises a first fluid port, the valve seat component comprises a second fluid port, the valve chamber comprises an upper chamber located above the valve core component, the valve core component comprises a flow balancing path; and in the case that the valve core abuts against the sealed ring, the upper chamber is not in communication with the first fluid port, and the upper chamber is in communication with the second fluid port through the flow balancing path.

19. The flow control valve according to claim 1, wherein the flow control valve is an electronic expansion valve or a solenoid valve.

20. The flow control valve according to claim 1, wherein, the outer bushing comprises a base portion abutting against the sealed ring and an diameter enlarging portion arranged above the base portion, an inner diameter of the diameter enlarging portion is greater than an inner diameter of the base portion, an inner wall of the base portion comprises the first inner wall portion, and the inner diameter of the diameter enlarging portion increases toward the direction away from the base portion from the base portion, the inner wall of the diameter enlarging portion comprises a first inclined surface, when the lower section portion moves upward from a state that the lower section portion abuts against the sealed ring until the lower section portion is matched with the first inclined surface, the lower section portion of the valve core is configured to be matched with the first inclined surface to adjust flow of the flow control valve.

* * * * *